United States Patent
Hong et al.

(10) Patent No.: US 7,330,567 B2
(45) Date of Patent: Feb. 12, 2008

(54) HUMAN TRACKING APPARATUS AND METHOD, STORAGE MEDIUM STORING PROGRAM EXECUTING THE METHOD, AND MOBILE ELECTRONIC SYSTEM INCLUDING THE APPARATUS

(75) Inventors: Youngjin Hong, Suwon-si (KR); Sangmin Yoon, Yongin-si (KR); Hyoungki Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 116 days.

(21) Appl. No.: 11/241,968

(22) Filed: Oct. 4, 2005

(65) Prior Publication Data

US 2006/0140450 A1    Jun. 29, 2006

(30) Foreign Application Priority Data

Dec. 14, 2004    (KR) ...................... 10-2004-0105650

(51) Int. Cl.
*G06K 9/00* (2006.01)
(52) U.S. Cl. ........................ 382/103; 382/107; 356/29; 356/139.06; 356/4.01
(58) Field of Classification Search .................. 356/29
See application file for complete search history.

(56) References Cited

U.S. PATENT DOCUMENTS

| 6,795,567 B1* | 9/2004 | Cham et al. ................. 382/103 |
| 2002/0014988 A1* | 2/2002 | Samukawa et al. ............ 342/70 |
| 2002/0027652 A1* | 3/2002 | Paromtchik et al. ...... 356/141.1 |
| 2002/0100884 A1* | 8/2002 | Maddock ............... 250/559.29 |

* cited by examiner

*Primary Examiner*—Thomas H. Tarcza
*Assistant Examiner*—Timothy A. Brainard
(74) *Attorney, Agent, or Firm*—Staas & Halsey LLP (57) ABSTRACT

A human tracking apparatus and a human tracking method, a storing medium storing a program for executing the method, and a mobile electronic system including the apparatus. The human tracking apparatus includes: an upper body location detection module detecting at least one piece of upper body location for a human; a leg location detection module detecting at least one piece of leg location for a human; a tracking object selection module selecting a tracking object based on the at least one piece of upper body location and the at least one piece of leg location; a tracking speed and orientation calculator calculating tracking speed and orientation of the mobile electronic system for tracking the tracking object selected by the tracking object selection module; a module operating the mobile electronic system; and a motor controller controlling the motor based on the calculated tracking speed and orientation.

29 Claims, 9 Drawing Sheets

HUMAN TRACKING APPARATUS AND METHOD, STORAGE MEDIUM STORING PROGRAM EXECUTING THE METHOD, AND MOBILE ELECTRONIC SYSTEM INCLUDING THE APPARATUS

CROSS-REFERENCE TO RELATED APPLICATION

This application claims the benefit of Korean Patent Application No. 10-2004-0105650, filed on Dec. 14, 2004, in the Korean Intellectual Property Office, the disclosure of which is incorporated herein by reference.

BACKGROUND OF THE INVENTION

1. Field of the Invention

The present invention relates to a human tracking technique in a mobile electronic system, and more particularly, to a human tracking apparatus and a human tracking method using a forwarding camera and structured light, a storing medium storing a program for executing the method, and a mobile electronic system including the apparatus.

2. Description of Related Art

A mobile robot (hereinafter referred to as a robot) is a mobile electronic system that repeatedly performs a simple operation instead of humans.

However, as the demand for more intelligent robots increases, many technologies related to the interaction between robots and humans have been developed. In order to interact with a human, the robot should primarily be able to track the human.

A conventional human tracking method detects an object movement using a picture difference between a background picture and an input picture. However, such a method cannot be efficiently applied to pictures having different backgrounds; only to pictures having the same background. Therefore, since the robot often uses pictures having different backgrounds, the robot cannot be efficiently operated if the robot tracks humans using the human tracking method.

Another human tracking method compares a human region detected from an omni-directional camera using template matching with profile data of a laser rangefinder and controls a motor of the robot according to a relative location between the robot and the human. However, such a method causes a tracking object loss when the template matching fails on a picture taken by the omni-directional camera, and an erroneous tracking of a similar object other than the tracking object.

Another human tracking method tracks a human who carries a transmitting device using a magnet. However, such a method requires the human to carry the transmitting device whenever the human want the robot to follow him.

The robot cannot avoid any obstacles using the above human tracking methods because the human tracking methods do not consider any obstacles and the robot cannot track the human's back; only the human's face.

BRIEF SUMMARY

An aspect of the present invention provides a human tracking apparatus and a human tracking method using a forward camera and structured light, and a storing medium storing a program for executing the method.

An aspect of the present invention also provides a human tracking apparatus and a human tracking method based on the human's upper body and leg, and a storing medium storing a program for executing the method.

An aspect of the present invention also provides a human tracking apparatus and a human tracking method capable of avoiding obstacles, and a storing medium storing a program for executing the method.

An aspect of the present invention also provides a human tracking apparatus and a human tracking method using a mobile electronic system that does not require the human to carry a transmitting device, and a storing medium storing a program for executing the method.

An aspect of the present invention also provides a mobile electronic system including the human tracking apparatus.

According to an aspect of the present invention, there is provided a human tracking apparatus, including: an upper body location detection module detecting at least one piece of upper body location for a human; a leg location detection module detecting at least one piece of leg location for the human; a tracking object selection module selecting a tracking object based on the at least one piece of upper body location and the at least one piece of leg location; and an operation module operating the human tracking apparatus for tracking the tracking object selected by the tracking object selection module.

According to another aspect of the present invention, there is provided a human tracking apparatus used for a mobile electronic system, including: an upper body location detection module detecting at least one piece of upper body location for a human; a leg location detection module detecting at least one piece of leg location for a human; a tracking object selection module selecting a tracking object based on the at least one piece of upper body location and the at least one piece of leg location; a tracking speed and orientation calculator calculating tracking speed and orientation of the mobile electronic system for tracking the tracking object selected by the tracking object selection module; a motor operating the mobile electronic system; and a motor controller controlling the motor based on the tracking speed and orientation calculated by the tracking speed and orientation calculator.

The obstacle register may detect an obstacle based on information of location of the tracking object selected by the tracking object selection module and information of location detected by the leg location detection module and registering information of location of the detected obstacle.

The tracking speed and orientation calculator may calculate the tracking speed and orientation based on the information of location of the selected tracking object and the obstacle location information registered in the obstacle register.

According to still another aspect of the present invention, there is provided a human tracking method, including: detecting at least one piece of upper body location and at least one piece of leg location; selecting a tracking object based on the at least one piece of upper body location and the at least one piece of leg location; and tracking the tracking object.

According to yet another aspect of the present invention, there is provided a human tracking method used by a mobile electronic system, including: detecting at least one piece of upper body location and at least one piece of leg location for a human; selecting a tracking object based on the at least one piece of upper body location and the at least one piece of leg location; calculating tracking speed and orientation of the mobile electronic system for tracking the selected tracking object; and controlling an operation of the mobile electronic system based on the calculated tracking speed and orientation.

According to further an aspect of the present invention, there is provided a computer-readable storage medium encoded with processing instructions for causing a processor to execute a human tracking method used by a mobile electronic system, the method including: detecting at least one piece of upper body location and at least one piece of leg location for a human; selecting a tracking object based on the at least one piece of upper body location and the at least one piece of leg location; calculating tracking speed and orientation of the mobile electronic system for tracking the selected tracking object; and controlling an operation of the mobile electronic system based on the calculated tracking speed and orientation.

According to further another aspect of the present invention, there is provided a mobile electronic system, including: an upper body location detection module detecting at least one piece of upper body location; a leg location detection module detecting at least one piece of leg location; a tracking object selection module selecting a tracking object based on the at least one piece of upper body location and the at least one piece of leg location; a tracking speed and orientation calculator calculating tracking speed and orientation of the mobile electronic system for tracking the tracking object selected by the tracking object selection module; a motor operating the mobile electronic system; and a motor controller controlling the motor based on the tracking speed and orientation calculated by the tracking speed and orientation calculator.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1:
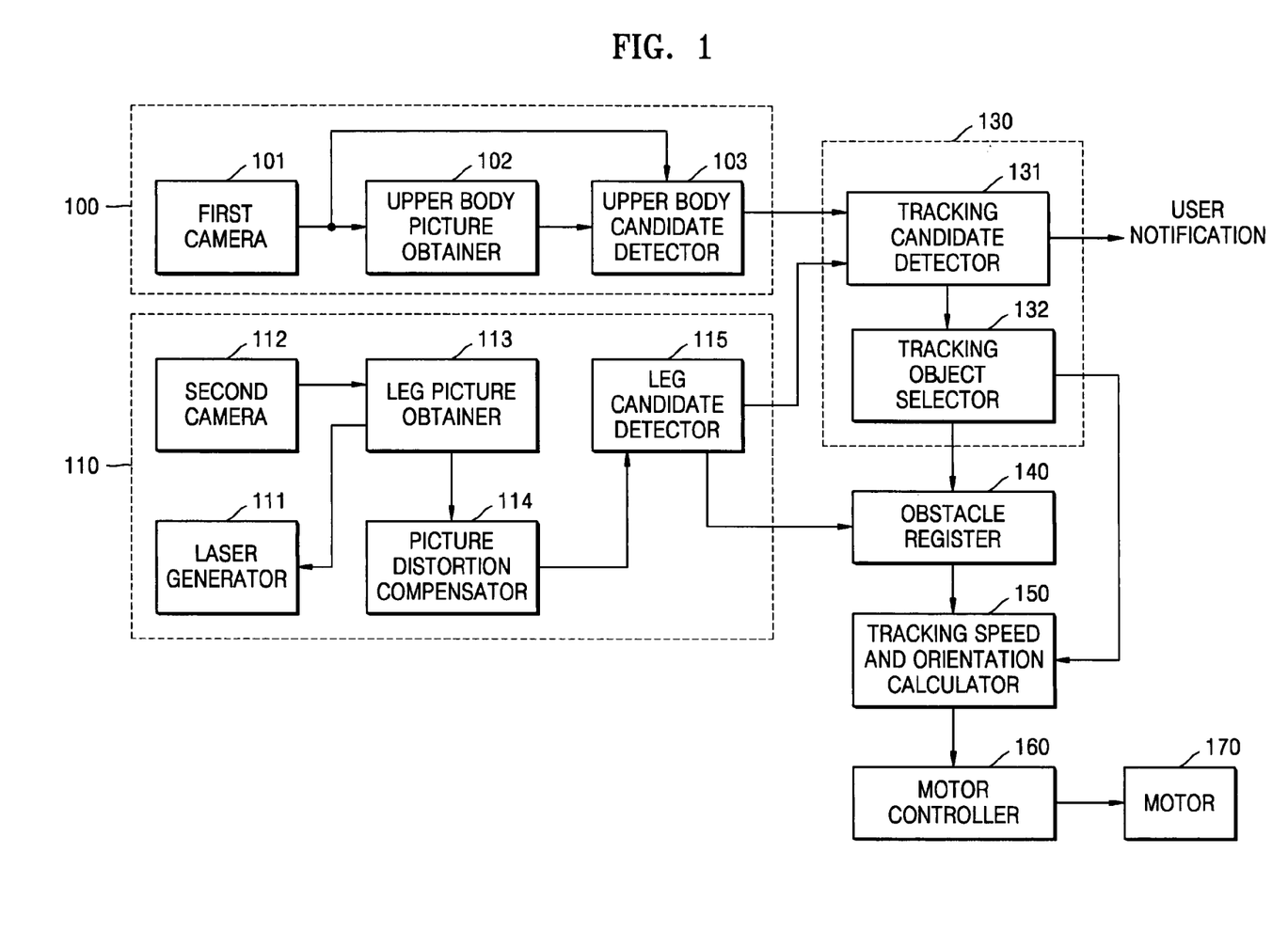
FIG. 1 is a block diagram of a human tracking apparatus according to an embodiment of the present invention.

FIG. 1 is a block diagram of a human tracking apparatus according to an embodiment of the present invention. Referring to FIG. 1, the human tracking apparatus comprises an upper body location detection module 100, a leg location detection module 110, a tracking object selection module 130, an obstacle register 140, a tracking speed and direction calculator 150, a motor controller 160, and a motor 170. The human tracking apparatus may be included in a mobile electronic system such as a robot.

The upper body location detection module 100 includes a first camera 101, an upper body picture obtainer 102, and an upper body candidate detector 103 to detect at least one piece of upper body location for a human.

The first camera 101 outputs a picture pick-up using predetermined picture pickup means. The first camera 101 photographs the front of a predetermined photographing distance when received a tracking start instruction from a user. The upper body of the user can be photographed by the mobile electronic system including the human tracking apparatus at the predetermined photographing distance after receiving the tracking start instruction from the user.

The predetermined photographing distance may be determined based on the tracking start instruction of the user in addition to a test result. For example, when the mobile electronic system is implemented to recognize the tracking start instruction using a human's voice or a human's clap, the recognized human's voice or human's clap is used to calculate a distance between the user and the mobile electronic system and the calculated distance can be determined as the predetermined photographing distance. The predetermined photographing distance may be established as 1 m.

The upper body picture obtainer 102 obtains a picture of a predetermined region in the output picture of the first camera 101 as an upper body picture. For example, the upper body picture obtainer 102 obtains a picture of the predetermined region (for example, the region 201 in FIG. 2) in an input picture provided by the first camera 101 as the upper body picture.

Figure 2:
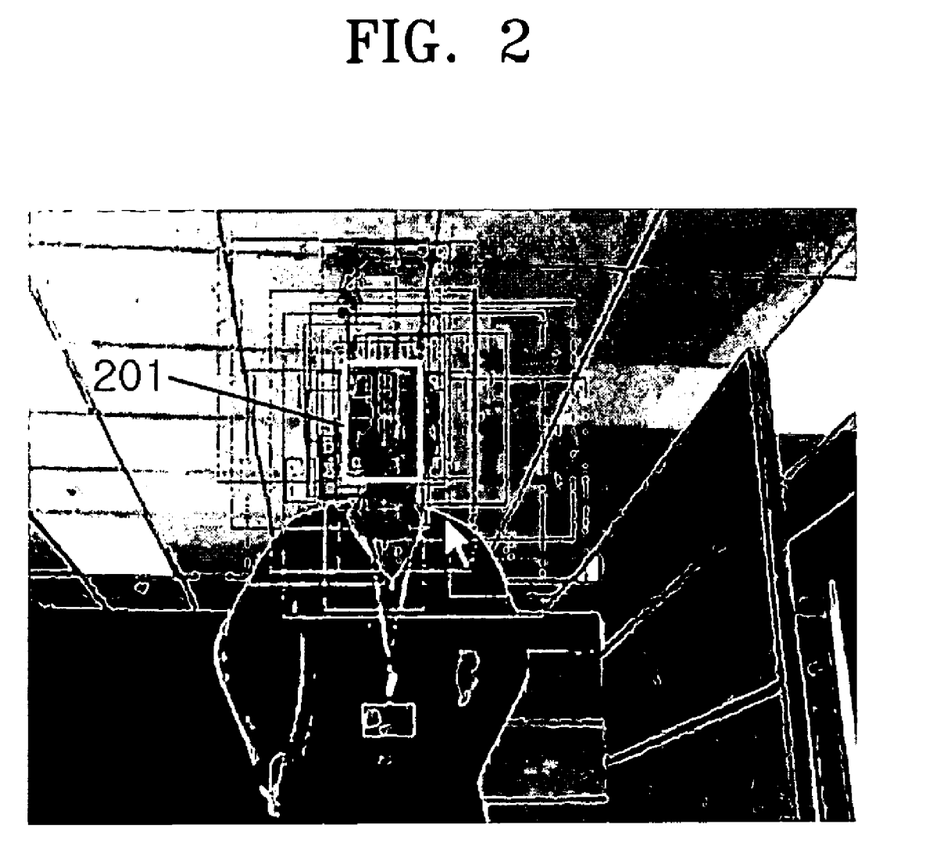
FIG. 2 is an exemplary diagram of an upper body picture region obtained by an upper body picture obtainer shown in FIG. 1.

FIG. 2 is an exemplary diagram of the upper body picture region obtained by the upper body picture obtainer 102 shown in FIG. 1. Referring to FIGS. 1 and 2, regardless of an upper body picture of a user's front, back, left, or right included in the input picture provided by the first camera 101, the upper body picture can be detected from region 201. Two-dimensional coordinate information on the region 201 is previously determined based on a test result.

The upper body picture obtainer 102 provides a quantified value of the number of colors in the region 201 using a color histogram regarding the upper body picture of the region 201 to the upper body candidate detector 103.

The upper body candidate detector 103 outputs the predetermined two-dimensional coordinate information regarding the region 201 as location information (or a relative coordinate value) of an upper body candidate (or an upper body candidate picture), in an initial frame.

In frames other than the initial frame, the upper body candidate detector 103 can detect at least one upper body candidate by particle-filtering and mean-shift tracking the input picture provided by the first camera 101 based on the quantified value of the number of colors in the upper body picture of the region 201.

Figure 3:
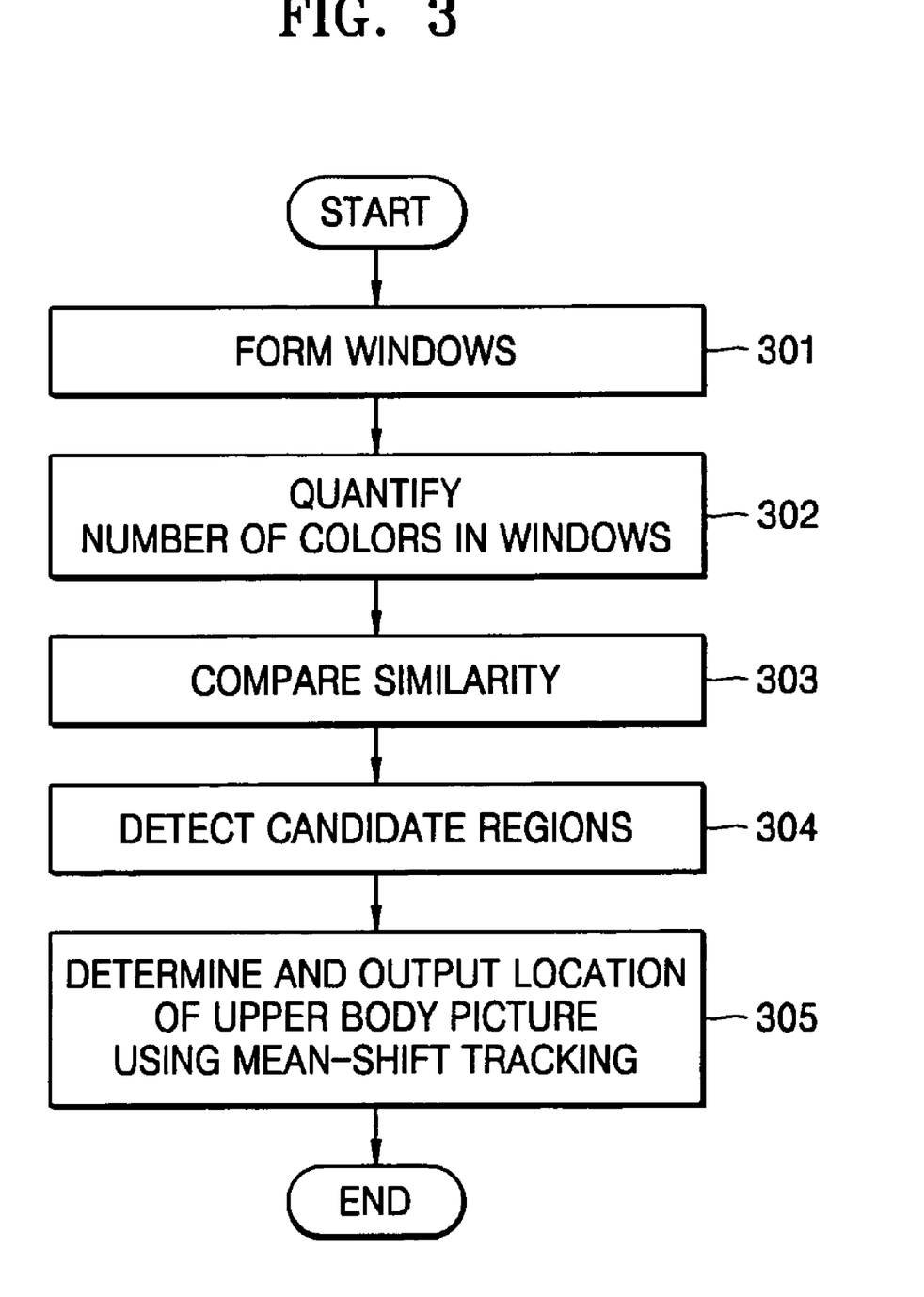
FIG. 3 is a flowchart of the operation of an upper body candidate detector shown in FIG. 1.

FIG. 3 is a flowchart of the operation of the upper body candidate detector 103 shown in FIG. 1. Referring to FIGS. 1-3, in operation 301, the upper body candidate detector 103 scatters several particles on a current frame picture provided by the first camera 101 and forms several windows around the scattered particles. If ten particles are scattered, ten windows are formed. The formed windows have the same size as the region 201.

In operation 302, the upper body candidate detector 103 quantifies the number of colors in the windows using a color histogram of each of the windows.

In operation 303, the upper body candidate detector 103 converts the quantified values of each of the windows into a Bhattacharyya coefficient and compares similarity between a tracking object window of a previous frame and each of the windows formed on the current frame picture. Information on the tracking object window of the previous frame is the quantified value on the upper body picture of the region 201 obtained by the upper body picture obtainer 102.

In operation 304, the upper body candidate detector 103 gives more weights on a window quite similar to the tracking object window of the previous frame among the windows formed on the current frame picture than other windows, gathers particles on the window quite similar to the tracking object window, and detects candidate regions of the upper body picture of the current frame picture.

The upper body candidate detector 103 uses a mean-shift tracking method for detecting a candidate region (or a particle) among the detected candidate regions. In operation 305, upper body candidate detector 103 takes the upper body picture obtained by the upper body picture obtainer 102 as a reference model, searches a candidate region closest and quite similar to the determined reference model among the detected candidate regions, determines the location of the searched candidate region as the location of the detected upper body candidate, and outputs the location information on the determined upper body candidate. The location information called a relative coordinate value is a two-dimensional coordinate value in the input picture provided by the first camera 101. The location information can be expressed as an orientation γ of the upper body. The location information is provided to the tracking object selection module 130.

The leg location detection module 110 includes a laser generator 111, a second camera 112, a leg picture obtainer 113, a picture distortion compensator 114, and a leg candidate detector 115 to detect at least one of leg location information for the human.

The leg picture obtainer 113 controls the laser generator 111 and projects a laser beam horizontally when received the tracking start instruction from the user. The projected laser beam is referred to as structured light (SL). The laser may be an infrared laser beam.

The second camera 112 uses a camera having an infrared filter when the laser generator 111 generates the infrared laser. The second camera 112 outputs a pickup picture of an SL laser line from the laser generator 111. In particular, the second camera 112 uses a fisheye lens for photographing a wider region.

The leg picture obtainer 113 controls the laser generator 111 and obtains a leg picture from the pickup input picture from the second camera 112. The obtained leg picture is a projection frame picture identical to the output picture of the second camera 112.

Like the upper body picture obtainer 102, the leg picture obtainer 113 may obtain a predetermined specific region in the output picture of the second camera 112 as the leg picture.

Figure 4:
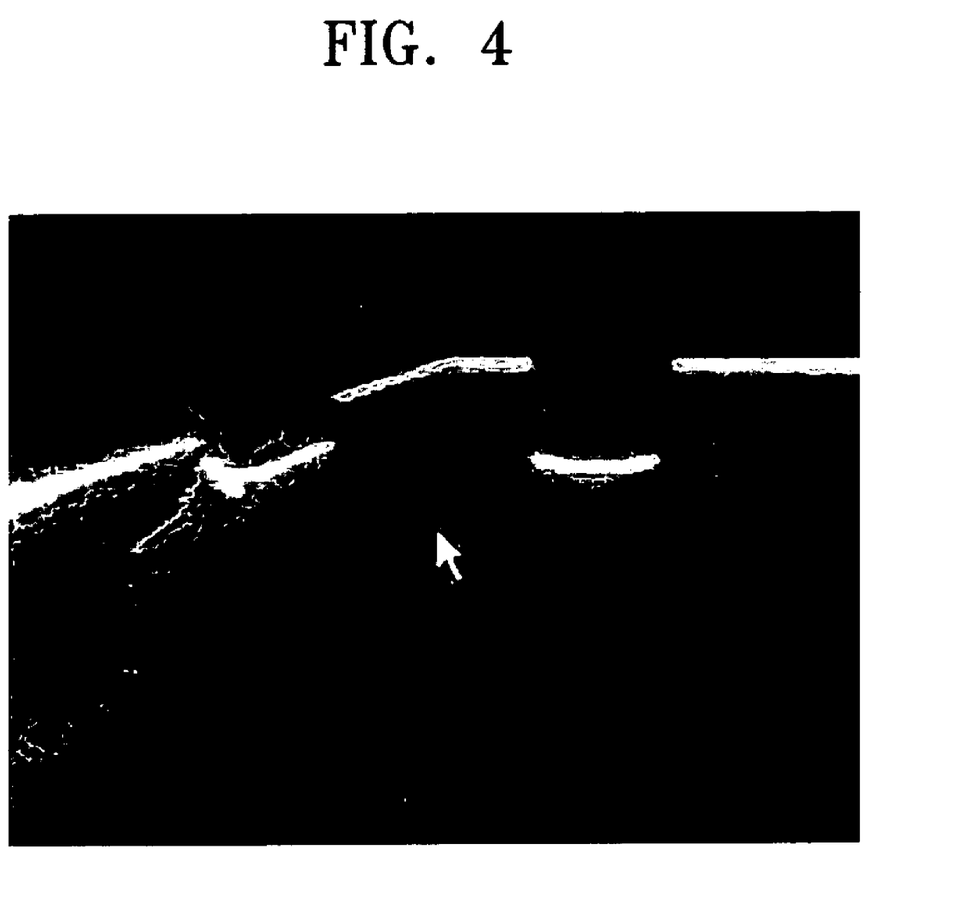
FIG. 4 is an exemplary diagram of a leg picture compensated in a picture distortion compensator shown in FIG. 1.

The picture distortion compensator 114 compensates for a distortion of the projection frame picture obtained by the leg picture obtainer 113. Such a distortion is a geometrical picture distortion caused by a lens (not shown) used in the second camera 112. When the second camera 112 uses the fisheye lens, the picture distortion compensator 114 compensates for both a radial distortion and a tangential distortion of the projection frame picture. The picture distortion compensator 114 outputs a projection picture whose distortion caused by the lens is compensated as shown in FIG. 4. FIG. 4 is an exemplary diagram of a leg picture compensated in the picture distortion compensator shown in FIG. 1.

Referring to FIGS. 1 and 3, the leg candidate detector 115 calculates a distance between pixels of a reflector based on an SL laser line included in the output projection picture of the picture distortion compensator 114.

Figure 5:
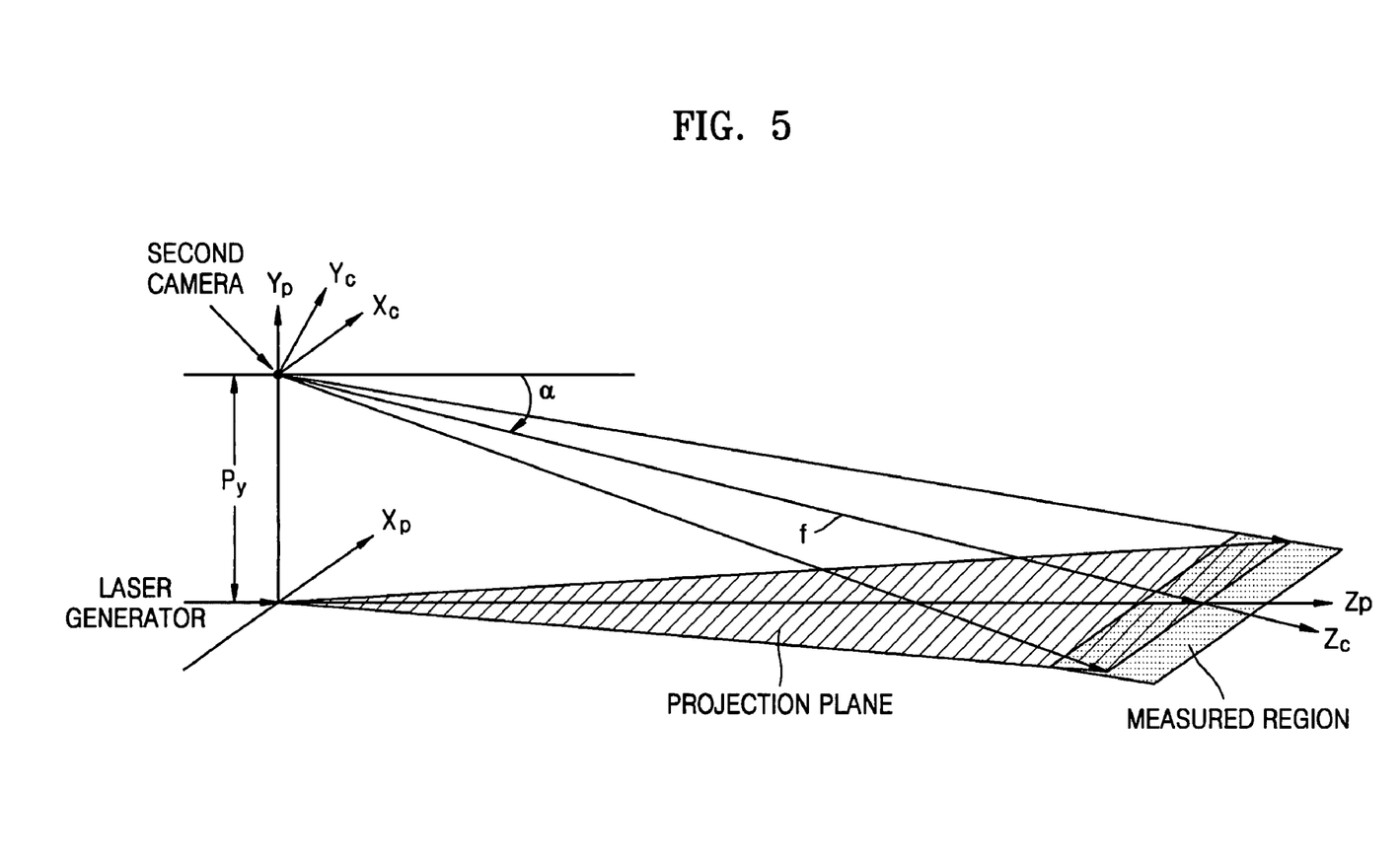
FIG. 5 illustrates the relationship between a laser generator and a second camera shown in FIG. 1, and a projection plane formed by a structured light (SL)

FIG. 5 illustrates the relationship between the laser generator 111, the second camera 112, and a projection plane formed by the structured light (SL) from the laser generator 111. Referring to FIGS. 1 and 5, XpYpZp denotes a frame of the laser generator 111, XcYcZc denotes a frame of the second camera 112, α denotes a rotation angle based on an X axis between the frames of the laser generator 111 and the second camera 112. Py denotes an offset distance toward a Y axis between the frames of the laser generator 111 and the second camera 112. The relationship between the frames XpYpZp and XcYcZc is given by Equation 1:

$$\begin{pmatrix} Xp \\ Yp \\ Zp \end{pmatrix} = \begin{pmatrix} 1 & 0 & 0 \\ 0 & \cos\alpha & -\sin\alpha \\ 0 & \sin\alpha & \cos\alpha \end{pmatrix} \begin{pmatrix} Xc \\ Yc \\ Zc \end{pmatrix} + \begin{pmatrix} 0 \\ Py \\ 0 \end{pmatrix} \quad (1)$$

As given in Equation 1, the leg candidate detector 115 calculates a distance Zp between each of the SL laser lines included in the obtained leg picture and the mobile electronic system including the human tracking apparatus and a right and left distance Xp between the mobile electronic system and each of the SL laser lines.

To be more specific, when Yp in the SL laser projection plane is 0, the frame XcYcZc of the second camera 112 is given by Equation 2, $$\begin{pmatrix} Xc \\ Yc \end{pmatrix} = \begin{pmatrix} Xs \cdot \dfrac{Sx}{f} \\ Ys \cdot \dfrac{Sy}{f} \end{pmatrix} \cdot Zc \quad (2)$$

wherein (Xs, Ys) is an object picture coordinate, and Sx/f, Sy/f are scale constants required to convert the object picture coordinate (Xs, Ys) into a spatial coordinate.

The condition that Yp in the SL laser projection plane is 0 and Equation 2 are used to obtain Equation 3:

$$Yp = (\cos\alpha \cdot Yc - \sin\alpha \cdot Zc) + Py = 0$$

$$Zc = \frac{Py}{\sin\alpha - \cos\alpha \cdot YS \cdot \frac{Sy}{f}} \quad (3)$$

The distance Zp between each of the SL laser lines and the mobile electronic system and the right and left distance Xp between the mobile electronic system and each of the SL laser lines using Equations 1, 2, and 3 are given by Equation 4:

$$Xp = XS \cdot \frac{Sx}{f} \cdot Zc$$

$$Zp = \sin\alpha \cdot Yc + \cos\alpha \cdot Zc \quad (4)$$

Figure 6:
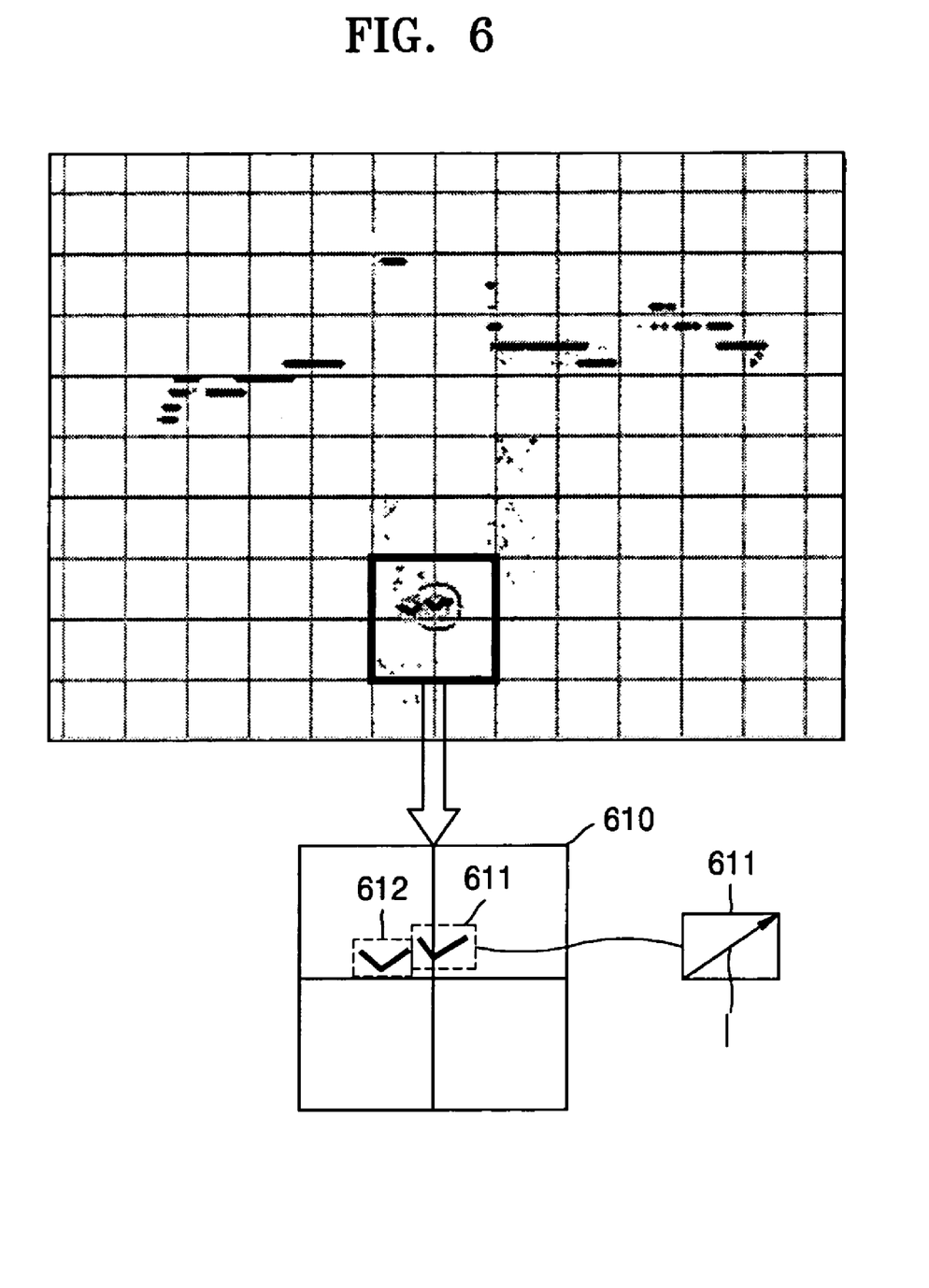
FIG. 6 illustrates a two-dimensional picture including an SL laser line pattern corresponding to a projection frame picture shown in FIG. 4.

The leg candidate detector 115 maps the calculated distances Zp and XP two-dimensionally, thereby obtaining a two-dimensional picture including an SL laser line pattern as shown in FIG. 6.

FIG. 6 illustrates the two-dimensional picture including the SL laser line pattern corresponding to the projection frame picture shown in FIG. 4. Referring to FIGS. 1 and 6, the leg candidate detector 115 detects leg candidates by grouping and clustering the two-dimensionally mapped picture according to the calculated distance between pixels. The leg candidate detector 115 obtains regions 611 and 612 in a region 610 by grouping and clustering the two-dimensionally mapped picture. The region 610 is an enlarged view of the two-dimensionally mapped picture.

The leg candidate detector 115 detects leg candidates by calculating diagonal lengths l of the regions 611 and 612 and comparing the calculated diagonal lengths l with a characteristic value of a predetermined leg pattern size. Because the diagonal lengths l of grouped and clustered regions are similar to the characteristic value of the leg pattern size, the leg candidate detector 115 calculates the center position of the grouped and clustered regions and collects them as leg candidates.

The leg pattern size is an attribute of an optimum leg pattern. The leg pattern size is determined based on leg pattern size of a plurality of adult males and females measured from 1 m and 3 m when the mobile electronic system sees a human's front, back, and side (right and left).

A two-dimensional coordinate value (a relative coordinate value) of the leg candidate detected by the leg candidate detector 115 is transmitted to the tracking object selection module 130.

The tracking object selection module 130 selects a tracking object using the two-dimensional coordinate values provided by the upper body candidate detector 103 and the leg candidate detector 115.

The tracking object selection module 130 includes a tracking candidate detector 131 and a tracking object selector 132.

The tracking candidate detector 131 detects leg candidates provided by the leg candidate detector 115 and the upper body candidate based on location information provided by the upper body candidate detector 103 as tracking candidates when selecting a tracking object in a first frame picture. The tracking candidate detector 131 determines a search range in which the location of the leg candidates selected as the tracking object at the first frame picture is a center coordinates in the second frame picture.

Figure 7A:
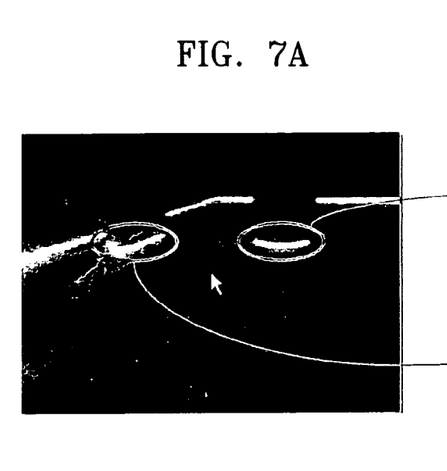
FIGS. 7A and 7B are exemplary diagrams of search ranges based on a tracking object detected at a first frame picture.
Figure 7B:
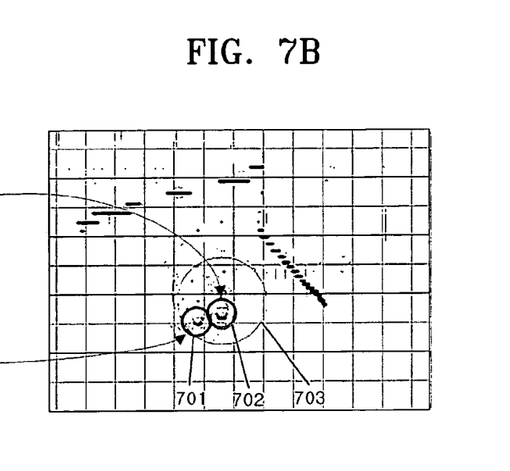

FIGS. 7A and 7B are exemplary diagrams of search ranges based on the tracking object detected at the first frame picture. Referring to FIGS. 1, &A, and 7B, when tracking objects detected at a projection frame picture shown in FIG. 7A are 701 and 702 shown in FIG. 7B, the search range is 703. The search range is determined based on an average stride and an average speed of adult male and female who walk forward and sideward, and a reaction speed of the mobile electronic system.

The tracking candidate detector 131 detects every leg candidate included in the search range as tracking candidates.

The tracking candidate detector 131 checks if the search range includes location information (or two-dimensional coordinate information) on the upper body candidate provided by the upper body candidate detector 103. If it is checked that the search range does not include the location information on the upper body candidate, the tracking candidate detector 131 disregards the location information on the upper body candidate in order to prevent an erroneous tracking caused by an erroneous detection of the location information of the upper body candidate.

In this case, the tracking candidate detector 131 informs the user of a tracking object loss by calling the user or using other methods.

When the search range does not include locations of the input leg candidates, the tracking candidate detector 131 informs the user of the tracking object loss.

When the upper body candidate detector 103 does not provide the location information of the upper body candidate or the leg candidate detector 115 does not provide the location information of the leg candidates, the tracking candidate detector 131 informs the user of a tracking object loss by calling the user or using other methods.

The tracking candidate detector 131 outputs the location information of the tracking candidates to the tracking object selector 132.

The tracking object selector 132 receives the location information of the upper body candidate and the leg candidates which are determined as the tracking candidates from the tracking candidate detector 131 and selects the optimum tracking object based on the received location information.

Figure 8:
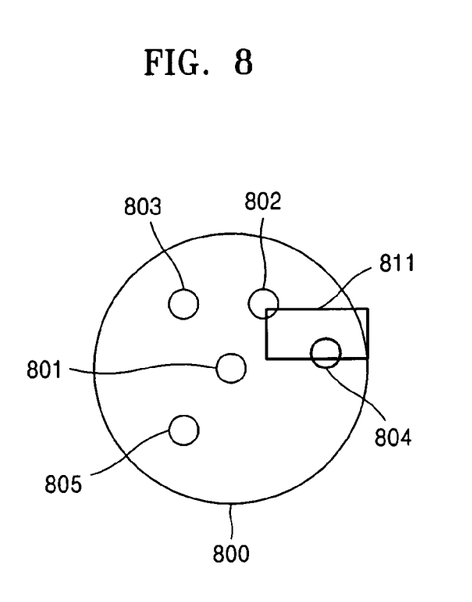
FIG. 8 illustrates a process of selecting a tracking object in a tracking object selector shown in FIG. 1.

FIG. 8 illustrates a process of selecting a tracking object in the tracking object selector 132 shown in FIG. 1. Referring to FIGS. 1 and 8, the tracking object selector 132 receives location information on a plurality of leg candidates 802, 803, 804, and 805 and an upper body picture 811 included in a search range 800 based on a previous tracking object location 801, selects the leg candidate 804 closest to the upper body candidate 811 as a tracking object, selects the location of a leg pattern candidate closest to the previous tracking object location 801 as the tracking object, or selects the location of an upper body candidate as the tracking object when the location of the upper body candidate is closer to the previous tracking object location 801 than other leg pattern candidates.

When the location of the leg candidate does not correspond to that of the upper body candidate, the tracking object selector 132 selects a location having the smallest displacement in the previous tracking object location 801 as the tracking object.

Figure 10:
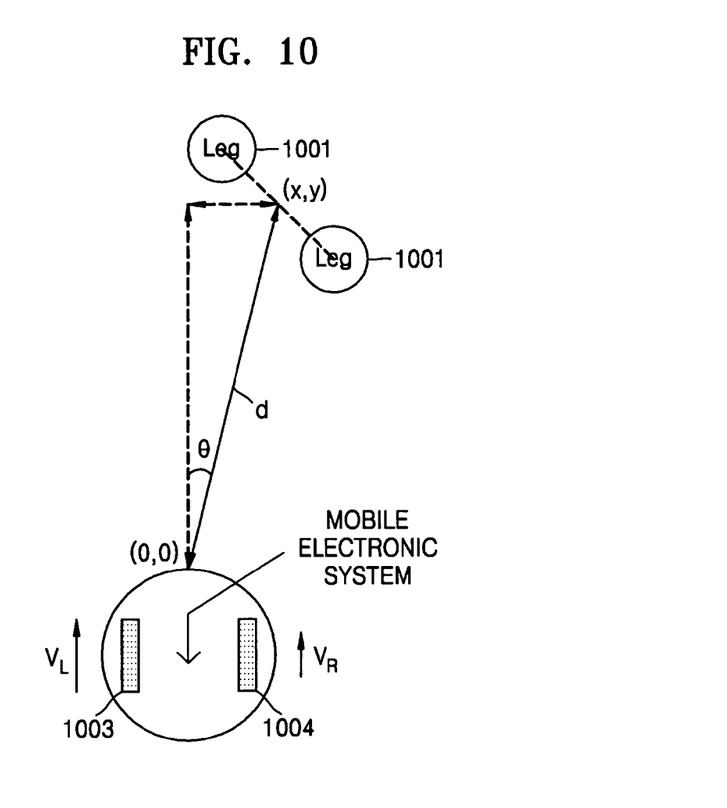
FIG. 10 illustrates a process of determining right and left rotation speeds of a mobile electronic system in a tracking speed and orientation calculator shown in FIG. 1.

To this end, the tracking object selector 132 calculates an orientation error and a distance error using a two-dimensional coordinate value of the leg candidate and calculates the orientation error using a two-dimensional coordinate value of the upper body candidate as given by Equation 5, $$orientation\,error = \arctan(y, x) - \frac{\pi}{2}$$
$$distance\,error = \sqrt{(x2 + y2)} - DO \qquad (5)$$

wherein DO denotes a tracking maintenance distance between the mobile electronic system and a human, and x, y denotes a two-dimensional coordinate value indicated in the center of a leg 1001.

The calculated orientation error and distance error are used to obtain the location relationship between each of leg candidates, an upper body candidate, and previous tracking objects within the search range.

After the tracking object is selected, the tracking object selector 132 provides the location information of the selected tracking object to an obstacle register 140 and a tracking speed and orientation calculator 150.

The obstacle register 140 compares the location information of the leg picture provided by the leg candidate detector 115 based on the SL laser line pattern with the location information of the tracking object provided by the tracking object selector 132. The location information of the leg picture based on the SL laser line pattern includes the location information of the SL laser line patterns that are detected and are not detected as a leg candidate by the leg candidate detector 115.

As a result of comparison, when the location information having the SL laser line pattern in addition to the location information of the tracking object is detected, the obstacle register 140 recognizes an SL laser line pattern having information on a location closest to the mobile electronic system among the detected location information having the SL laser line pattern as an obstacle to be avoided by the mobile electronic system.

The obstacle register 140 selects the SL laser line pattern closest to the mobile electronic system as the obstacle and registers the location information of the selected obstacle. The location information having the SL laser line pattern that is selected as the obstacle may be the location information obtained by grouping and clustering the SL laser line pattern.

Figure 9:
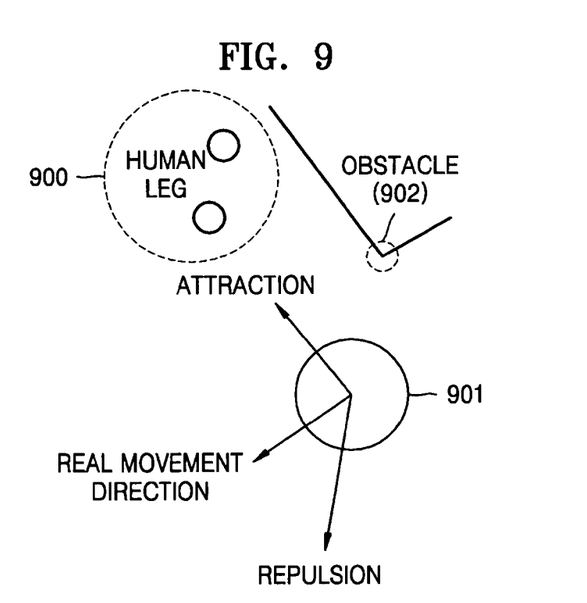
FIG. 9 illustrates the relationship between a tracking speed and an obstacle avoidance speed.

FIG. 9 illustrates the relationship between a tracking speed and an obstacle avoidance speed. Referring to FIGS. 1 and 9, the tracking speed and orientation calculator 150 receives the location information of the tracking object from the tracking object selector 132 and the location information of the obstacle from the obstacle register 140 and determines final tracking orientation and speed of a mobile electronic system 901 using a vector sum of attraction between a human 900 and the mobile electronic system 901 and repulsion between an obstacle 902 and the mobile electronic system 901.

FIG. 10 illustrates a process of determining right and left rotation speeds of a mobile electronic system in the tracking speed and orientation calculator 150 shown in FIG. 1. Referring to FIGS. 1 and 10, the tracking speed and orientation calculator 150 determines a rotation speed of right and left wheels 1003 and 1004 of a mobile electronic system 1002 based on relative errors of the distance d and the orientation θ between a selected tracking object 1001 and the mobile electronic system 1002, so that the mobile electronic system 1002 moves in a reverse direction of an obstacle location. A proportional integral derivative (PID) control algorithm can be used to determine the rotation speed of the right and left wheels 1003 and 1004.

The motor controller 160 controls rotation orientation and speed of the motor 170 included in the mobile electronic system 1002 according to the calculated tracking speed and orientation. The motor 170 is used to rotate the right and left wheels 1003 and 1004 included in the mobile electronic system 1002.

The tracking speed and orientation calculator 150, the motor controller 160, and the motor 170 are defined as am operating module for operating the human tracking apparatus used to track the selected tracking object. However, the human tracking apparatus calculates the tracking orientation at a fixed location and tracks the tracking object based on the calculated tracking orientation.

Figure 11:
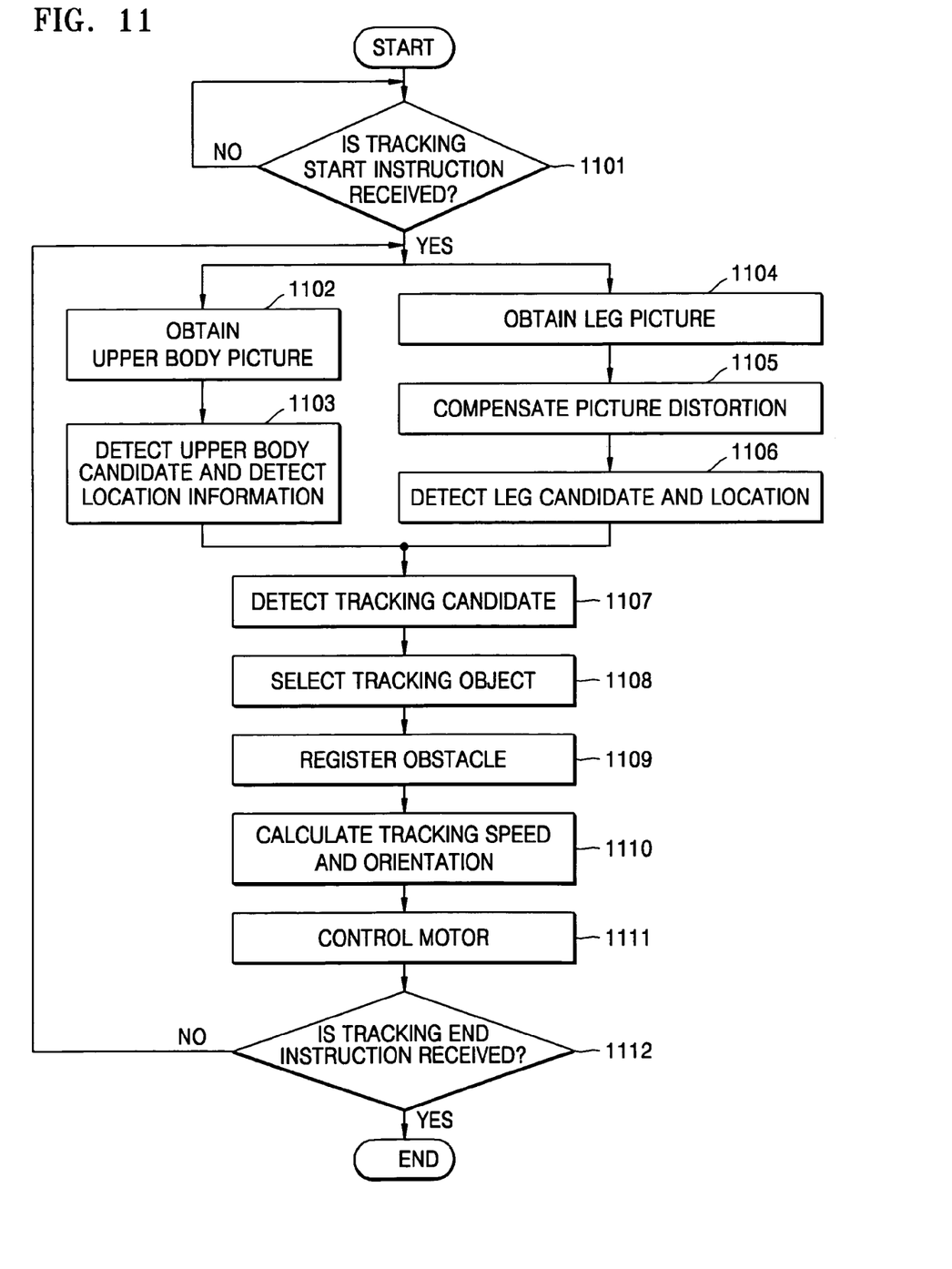
FIG. 11 is a flowchart of a human tracking method according to an embodiment of the present invention.

FIG. 11 is a flowchart of a human tracking method according to an embodiment of the present invention. Referring to FIGS. 1 and 11, when a mobile electronic system receives a tracking start instruction by a user's voice or clap (operation 1101), it controls the first camera 101 and photographs the front of a predetermined distance. The mobile electronic system obtains an upper body picture of the user from the photographed picture (operation 1102) like in the upper body picture obtainer 102 shown in FIG. 1. Therefore, the upper body picture can be obtained from the photographed picture regardless of a user's front, back, and side.

The mobile electronic system detects an upper body candidate (or an upper body candidate picture) from a next frame picture based on the obtained upper body picture (operation 1103) using the particle filtering and the mean-shift tracking like in the upper body candidate detector 103 shown in FIG. 1. The mobile electronic system detects the location information on the upper body candidate in an input picture using the upper body picture. The location information may be two-dimensional coordinate information.

The mobile electronic system generates laser by controlling the laser generator 111 and obtains a projection picture including an SL laser line provided by the second camera 112 as a leg picture (operation 1104).

The mobile electronic system compensates for a distortion of the obtained leg picture (operation 1105). The compensated picture distortion is a distortion caused by the lens included in the second camera 112. The mobile electronic system detects a leg candidate using an SL laser line pattern of the compensated leg picture like in the leg candidate detector 115 shown in FIG. 1, and detects the location information of the detected leg candidate (operation 1106). The detected location information is two-dimensional coordinate information.

The mobile electronic system detects tracking candidates using the location information of the upper body candidate detected in operation 1103 and the location information of the leg candidate detected in operation 1106 like in the tracking candidate detector 131 (operation 1107). If the location information of the upper body candidate is not detected in operation 1103, the location information of the leg candidate is not detected in operation 1106, or the detected location information of the upper body candidate and the leg candidate is not included in a search range determined based on a previous tracking object, the mobile electronic system can inform the user of a tracking object loss.

The mobile electronic system selects tracking object among the detected tracking candidates (operation 1108) like in the tracking object selector 132 shown in FIG. 1.

The mobile electronic system registers an obstacle based on the location information of the selected tracking object and the location information based on the SL laser line pattern used to detect the leg candidates in operation 1106 (operation 1109). Like in the obstacle register 140 shown in FIG. 1, the mobile electronic system excludes the location information of the selected tracking object from the location information based on the SL laser line pattern and registers an SL laser line pattern having information on a location closest to the mobile electronic system as the obstacle. The location information based on the SL laser line pattern may be location information by grouping and clustering SL laser line pattern.

The mobile electronic system calculates tracking speed and orientation based on the location information of the tracking object selected in operation 1108 and the location information of the obstacle registered in operation 1109 like in the tracking speed and orientation calculator 150 shown in FIG. 1 (operation 1110).

The calculated tracking speed and orientation are used to control a motor (not shown) for controlling movement of the mobile electronic system (operation 1111). If the mobile electronics system receives a tracking end instruction from the user, it ends the upper body candidate tracking and the leg candidate tracking. However, if the mobile electronics system does not receive the tracking instruction from the user, operations 1102 and 1104 are performed.

The above-described embodiments of the present invention may be realized on a computer-readable recording medium as a computer-readable code. Computer-readable recording mediums include every kind of recording device that stores computer system-readable data. ROMs, RAMs, CD-ROMs, magnetic tapes, floppy discs, optical data storage, etc. are used as a computer-readable recording medium. Computer-readable recording mediums can also be realized in the form of a carrier wave (e.g., transmission through Internet). A computer-readable recording medium is dispersed in a network-connecting computer system, resulting in being stored and executed as a computer-readable code by a dispersion method.

The mobile electronic system (robot) of the above-described embodiments does not require a user to carry a transmitting device in order to track the user. Since the mobile electronic system tracks an upper body picture based on a user's front, back, and side, it can track the user regardless of a user's position.

A tracking object and an obstacle detection result are used to control tracking speed and orientation of the mobile electronic system, such that the mobile electronic system can avoid an obstacle while tracking. Also, the mobile electronic system can prevent an erroneous tracking using a tracking result of a user's upper body and legs.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A human tracking apparatus, comprising:
an upper body location detection module detecting at least one piece of upper body location for a human;
a leg location detection module detecting at least one piece of leg location for the human;
a tracking object selection module selecting a tracking object based on the at least one piece of upper body location and the at least one piece of leg location; and
an operation module operating the human tracking apparatus for tracking the tracking object selected by the tracking object selection module,
wherein the tracking object selection module comprises:
a tracking candidate detector detecting information of upper body location and leg location included in a predetermined search range among information of the at least one piece of upper body location and the at least one piece of leg location as tracking candidate information; and
a tracking object selector selecting the tracking object based on the tracking candidate information detected by the tracking candidate detector, and
wherein the tracking object selector selects information of leg location closest to information of upper body location included in the tracking candidate as tracking object information when the tracking candidate includes information of a plurality of leg locations.

2. The apparatus of claim 1, wherein the predetermined search range is determined based on a previously selected tracking object.

3. The apparatus of claim 1, wherein the predetermined search range is determined based on an average stride and an average speed of adult male and an adult female walking forward and sideward, and a reaction speed of a mobile electronic system.

4. The apparatus of claim 1, wherein the tracking candidate detector outputs a signal that informs a user of a tracking object loss when the predetermined search range does not include information of at least one piece of upper body location or information of at least one piece of leg location.

5. The apparatus of claim 1, wherein the tracking object selector selects information of leg location closest to a previously selected tracking object location as tracking object information when the tracking candidate includes information of the plurality of leg locations.

6. The apparatus of claim 1, wherein the leg location detection module comprises:
a laser generator transmitting laser;
a camera picking up a laser line generated by the laser generator;
a leg picture obtainer obtaining the pickup laser line picture through the camera as a leg picture; and
a leg candidate detector detecting information of the at least one piece of leg location of the leg picture obtained by the leg picture obtainer as a leg candidate.

7. The apparatus of claim 6, wherein the leg candidate detector detects information of the at least one piece of leg location by calculating a distance between the human tracking apparatus and the laser line and right and left distances between the human tracking apparatus and the laser line, obtaining a two-dimensionally mapped picture using the calculated distances, grouping and clustering the two-dimensionally mapped picture, and comparing diagonal lengths of clustered picture regions with previously determined leg pattern attribute.

8. The apparatus of claim 7, wherein the leg pattern attribute is determined based on leg pattern sizes of a plurality of adult males and adult females measured at a predetermined distance when the human tracking apparatus sees a human's front, back, and side.

9. A human tracking apparatus used for a mobile electronic system, comprising:

an upper body location detection module detecting at least one piece of upper body location for a human;

a leg location detection module detecting at least one piece of leg location for a human;

a tracking object selection module selecting a tracking object based on the at least one piece of upper body location and the at least one piece of leg location;

a tracking speed and orientation calculator calculating tracking speed and orientation of the mobile electronic system for tracking the tracking object selected by the tracking object selection module;

a motor operating the mobile electronic system; and a motor controller controlling the motor based on the tracking speed and orientation calculated by the tracking speed and orientation calculator, wherein the tracking object selection module comprises:

a tracking candidate detector detecting information of upper body location and leg location included in a predetermined search range among information of the at least one piece of upper body location and the at least one piece of leg location as tracking candidate information; and a tracking object selector selecting the tracking object based on the tracking candidate information detected by the tracking candidate detector, and wherein the tracking object selector selects leg location information closest to information of upper body location included in the tracking candidate as tracking object information when the tracking candidate includes information of a plurality of leg locations.

10. The apparatus of claim 9, wherein the predetermined search range is determined based on a previously selected tracking object.

11. The apparatus of claim 9, wherein the predetermined search range is determined based on an average stride and an average speed of an adult male and an adult female walking forward and sideward, and a reaction speed of a mobile electronic system.

12. The apparatus of claim 9, wherein the tracking candidate detector outputs a signal that informs a user of a tracking object loss when the predetermined search range does not include information of at least one piece of upper body location or information of at least one piece of leg location.

13. The apparatus of claim 9, wherein the tracking object selector selects information of leg location closest to a previously selected tracking object location as tracking object information when the tracking candidate includes information of the plurality of leg locations.

14. The apparatus of claim 9, wherein the leg location detection module comprises:

a laser generator transmitting laser;

a camera picking up a laser line generated by the laser generator;

a leg picture obtainer obtaining the pickup laser line picture through the camera as a leg picture; and a leg candidate detector detecting information of the at least one piece of leg location of the leg picture obtained by the leg picture obtainer as a leg candidate.

15. The apparatus of claim 14, wherein the leg candidate detector detects the information of at least one piece of leg location by calculating a distance between the human tracking apparatus and the laser line and right and left distances between the human tracking apparatus and the laser line, obtaining a two-dimensionally mapped picture using the calculated distances, grouping and clustering the two-dimensionally mapped picture, and comparing diagonal lengths of clustered picture regions with previously determined leg pattern attribute.

16. The apparatus of claim 15, wherein the leg pattern attribute is determined based on leg pattern sizes of a plurality of adult males and adult females measured at a predetermined distance when the human tracking apparatus sees a human's front, back, and side.

17. The apparatus of claim 14, further comprising an obstacle register detecting an obstacle based on information of location of the tracking object selected by the tracking object selection module and information of location detected by the leg location detection module and registering information of location of the detected obstacle.

18. The apparatus of claim 17, wherein the obstacle register registers information of location closest to the mobile electronic system in information of location excluding the information of location of the selected tracking object from the information of location detected by the leg location detection module as the location information of the detected obstacle.

19. The apparatus of claim 17, wherein the information of location detected by the leg location detection module is information based on a laser line pattern included in the laser line picture.

20. The apparatus of claim 17, wherein the tracking speed and orientation calculator calculates the tracking speed and orientation based on the information of location of the selected tracking object and the information of obstacle location registered in the obstacle register.

21. The apparatus of claim 17, wherein the tracking speed and orientation calculator calculates the tracking speed and orientation using a vector sum of attraction between a human and the mobile electronic system and repulsion between the obstacle and the mobile electronic system based on the information of location of the selected tracking object and the information of obstacle location registered in the obstacle register.

22. The apparatus of claim 9, further comprising an obstacle register detecting an obstacle based on information of location of the tracking object selected by the tracking object selection module and information of location detected by the leg location detection module and registering information of location of the detected obstacle.

23. The apparatus of claim 9, wherein the upper body location detection module detects the at least one piece of upper body location from a pickup picture using a forwarding camera based on a region considering the human's front, back, and side.

24. A human tracking method, comprising:

detecting at least one piece of upper body location and at least one piece of leg location;

selecting a tracking object based on the at least one piece of upper body location and the at least one piece of leg location;

tracking the tracking object, wherein the selecting of the tracking object detects upper body location and leg location included in a predetermined search rancie among the at least one piece of upper body location and the at least one piece of leg location as location of a tracking candidate, and selects the tracking object based on the detected location of the tracking candidate; and selecting information of leg location closest to information of upper body location included in a tracking candidate as tracking object information when the tracking candidate includes information of a plurality of leg locations.

25. A human tracking method used by a mobile electronic system, comprising:
   detecting at least one piece of upper body location and at least one piece of leg location for a human;
   selecting a tracking object based on the at least one piece of upper body location and the at least one piece of leg location;
   calculating tracking speed and orientation of the mobile electronic system for tracking the selected tracking object;
   controlling an operation of the mobile electronic system based on the calculated tracking speed and orientation; and
   registering information of location closest to the mobile electronic system in the location excluding the location of the selected tracking object from location detected from a leg picture obtained for detecting the leg location as the location information of an obstacle,
   wherein the obtained leg picture has a laser line pattern and the location information detected from the obtained leg picture is based on the laser line pattern.

26. The method of claim 25, wherein the selecting of the tracking object detects upper body location and leg location included in a predetermined search range among the at least one piece of upper body location and the at least one piece of leg location as location of a tracking candidate, and selects the location of the tracking object in the detected location of the tracking candidate.

27. The method of claim 25, wherein the tracking speed and orientation are calculated based on the location information of the selected tracking object and the obstacle location information.

28. A computer-readable storage medium encoded with processing instructions for causing a processor to perform a human tracking method used by a mobile electronic system, the method comprising:
   detecting at least one piece of upper body location and at least one piece of leg location for a human;
   selecting a tracking object based on the at least one piece of upper body location and the at least one piece of leg location;
   calculating tracking speed and orientation of the mobile electronic system for tracking the selected tracking object; and
   controlling an operation of the mobile electronic system based on the calculated tracking speed and orientation; and
   registering information of location closest to the mobile electronic system in the location excluding the location of the selected tracking object from location detected from a leg picture obtained for detecting the leg location as the location information of an obstacle,
   wherein the obtained leg picture has a laser line pattern and the location information detected from the obtained leg picture is based on the laser line pattern.

29. A mobile electronic system, comprising:
   an upper body location detection module detecting at least one piece of upper body location information;
   a leg location detection module detecting at least one piece of leg location information;
   a tracking object selection module selecting a tracking object based on the at least one piece of upper body location and the at least one piece of leg location;
   a tracking speed and orientation calculator calculating tracking speed and orientation of the mobile electronic system for tracking the tracking object selected by the tracking object selection module;
   a motor operating the mobile electronic system; and
   a motor controller controlling the motor based on the tracking speed and orientation calculated by the tracking speed and orientation calculator,
   wherein the tracking object selection module comprises:
      a tracking candidate detector detecting information of upper body location and leg location included in a predetermined search range among information of the at least one piece of upper body location and the at least one piece of leg location as tracking candidate information; and
      a tracking object selector selecting the tracking object based on the tracking candidate information detected by the tracking candidate detector, and
   wherein one of:
      the tracking object selector selects information of leg location closest to information of upper body location included in the tracking candidate as tracking object information when the tracking candidate includes information of a plurality of leg locations, or
      the tracking object selector selects information of leg location closest to a previously selected tracking object location as tracking object information when the tracking candidate includes information of the plurality of leg locations.

* * * * *

UNITED STATES PATENT AND TRADEMARK OFFICE
CERTIFICATE OF CORRECTION

PATENT NO. : 7,330,567 B2 Page 1 of 1
APPLICATION NO. : 11/241968
DATED : February 12, 2008
INVENTOR(S) : Youngjin Hong et al.

It is certified that error appears in the above-identified patent and that said Letters Patent is hereby corrected as shown below:

Column 14, Line 59, change "rancie" to --range--.

Signed and Sealed this

Twenty-second Day of July, 2008

JON W. DUDAS
*Director of the United States Patent and Trademark Office*